(12) United States Patent
Glemser et al.

(10) Patent No.: US 6,670,804 B1
(45) Date of Patent: Dec. 30, 2003

(54) METHOD FOR DETERMINING THE ANGULAR POSITION OF A ROTATIVE PART WHICH PERFORMS A ROTATIONAL MOVEMENT

(75) Inventors: Andreas Glemser, Ueberlingen (DE); Herbert Jochum, Horgenzell (DE); Lothar Schauer, Markdorf (DE); Helmut Serr, Friedrichshafen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/048,085

(22) PCT Filed: Jul. 7, 2000

(86) PCT No.: PCT/EP00/06475

§ 371 (c)(1),
(2), (4) Date: Jan. 24, 2002

(87) PCT Pub. No.: WO01/08961

PCT Pub. Date: Feb. 8, 2001

(30) Foreign Application Priority Data

Jul. 28, 1999 (DE) .......................................... 199 35 429

(51) Int. Cl.[7] .............................. G01B 7/30; B62D 15/02
(52) U.S. Cl. ............................ 324/207.16; 324/207.25; 439/15; 340/870.31
(58) Field of Search ........................ 324/207.15–207.17, 324/207.25; 439/15, 164; 340/870.31, 870.35; 73/118.1; 336/15, 20

(56) References Cited

U.S. PATENT DOCUMENTS

| 5,475,302 | A | * | 12/1995 | Mehnert et al. | ........ 324/207.17 |
| 5,646,523 | A | * | 7/1997 | Kaiser et al. | ............ 324/207.2 |
| 5,944,544 | A | * | 8/1999 | Kuroda et al. | ............... 439/164 |
| 6,111,402 | A | * | 8/2000 | Fischer | ................... 324/207.17 |
| 6,155,106 | A | * | 12/2000 | Sano | .......................... 73/118.1 |
| 6,476,605 | B1 | * | 11/2002 | de Coulon | ................... 324/243 |

FOREIGN PATENT DOCUMENTS

| DE | 4437941 | 4/1996 |
| DE | 19835886 | 2/1999 |
| DE | 19904000 | 8/2000 |
| EP | 0250625 | 1/1988 |

* cited by examiner

*Primary Examiner*—Jay Patidar
*Assistant Examiner*—Darrell Kinder
(74) *Attorney, Agent, or Firm*—W. F. Fasse; W. G. Fasse

(57) ABSTRACT

A winding band including at least one conductor is arranged on a carrier in a housing, and is coupled to a rotative part, so that a wound-up length of a wound-up portion of the winding band varies corresponding to a rotational movement of the rotative part. At least one measuring inductor is arranged proximate to the wound-up portion of the winding band. The angular position of the rotative part is determined by detecting an electromagnetic field coupling between the measuring inductor and the wound-up portion of the winding band, and evaluating the amplitude, frequency and/or phase of an induced voltage arising in the inductor due to the coupling.

11 Claims, 1 Drawing Sheet

METHOD FOR DETERMINING THE ANGULAR POSITION OF A ROTATIVE PART WHICH PERFORMS A ROTATIONAL MOVEMENT

FIELD OF THE INVENTION

The invention relates to a method for determining the angular position of a rotative part carrying out rotational movements.

BACKGROUND INFORMATION

IN many fields of application, especially in the field of motor vehicles, in automation technology, measurement technology, control technology, and signal transmission technology, or in the field of machine tools, the rotational angle and therewith the angular position of parts carrying out rotational movements must be determined. For motor vehicles, for example, the steering wheel angle or the steering wheel position is helpful or indispensable as a measure for the position of the steering wheel in many applications, especially for the operation of driving dynamic systems (for example adaptive damping systems, all wheel drive, rear axle steering), driving assistance systems (for example separation distance warning systems, separation distance control systems) or navigation systems. For detecting the angular position, in addition to magnetic methods (incremental measurement of the angle by means of a plurality of magnets), optical methods are also in use (contact-less and wear-free measurement of the angle by means of coded disks). In many cases, a component of the rotative part carrying out the rotational movement is a flexible flat band (winding band) that is guided on a carrier and arranged in a housing, and that consists of a single electrical conductor or plural parallel electrical conductors, and with which an electrically conducting connection and a signal transmission to a stationary part can be realized. For example, such a winding band is used in motor vehicles for the electrical connection of the steering wheel and steering column. Often, rotational movements of the rotative part of more than 360° are also to be realized and detected, for example, six complete rotations of the steering wheel are possible relative to the fixed steering column. In order to shorten the length of the winding band required for the rotational movement, a deflection (for example realized by means of a deflection roller) can be provided. For the determination of the angular position of the rotative part carrying out the rotational movements (for the position determination), the relative rotational path or travel of the winding band is detected and evaluated by means of a measuring arrangement. According to the DE 198 35 886 A1, which forms the generic class, the relative number of the rotations between the stationary and the rotative part is detected by a measurement of the inductivity of the winding band, which adjusts itself or varies corresponding to the rotational path or travel or the rotational position, whereby the measurement is achieved between a fixedly located and a movable contact of a conductor of the winding band. It is disadvantageous in this context, that the inductivities or inductivity variations of the winding band that are to be measured are extremely small and thus parasitic inductivities (for example those from supply lines) falsify the inductivity measurement, that a non-linear relationship between the rotational path or travel and the inductivity results, and that a separate return line is necessary between the beginning and the end of the winding band that forms the inductivity, whereby this return line hinders the uninterfered movement of the winding band and of the rotative part and thus impairs the manner of operation and does not allow a series mass production utilization of this method.

SUMMARY OF THE INVENTION

The invention is based he object, to provide a simple method for the determination of the angular position of a rotative part carrying out rotational movements with advantageous characteristics with respect to the reliability, the costs, and the field of application. This object is achieved according to the invention by the features defined in the claims.

In the presented method, a determination of the angular position and therewith an absolute position detection of a rotative part carrying out rotational movements is realized over the entire rotational range of the winding band without moved mechanical additional components, without additional rotational moment, friction or noise generation, in that the electromagnetic field coupling between the winding band and at least one (additional) measuring inductivity or inductance (coupling coil) is detected and evaluated. The at least one measuring inductance is arranged in such a manner on the winding band or in the proximity of the winding band, so that the best possible electromagnetic field coupling between the winding band and the measuring inductance results. For example, the at least one measuring inductance is arranged in a parallel plane to the winding band, for example being applied on the housing or the carrier of the winding band. The at least one measuring inductance may be realized, for example, as a copper coil or as conductor paths arranged on a circuit board. In the event that more than one measuring inductance is provided, one of these measuring inductances can also be utilized for reference measurements for the calibration. The detection of the electromagnetic field coupling is achieved by means of the feeding-in of an alternating voltage as an input signal either over a measuring inductance or over the winding band, and the evaluation of the output voltage as the resulting output signal with respect to changes or variations of the phase and/or the amplitude and/or the frequency. The evaluation of the output signals can be carried out according to various different principles, either by forming ratios of the measured value output voltage (ratiometrically) or by the direct measurement of absolute values of the measured value output voltage, whereby the output signal (the output voltage) is transformed into a corresponding rotational angle and therewith into a corresponding angular position of the rotative part. The conductors or lines for the feeding-in of the input signals (supply lines) and for the picking-up or tapping of the output signals (return lines) can be guided within the housing of the winding band. In the event the width of the windings of the measuring inductance is smaller than the width of the electrical conductors of the winding band, then that respective partial area of the winding band, which comprises the smallest electromagnetic field coupling to the windings of the measuring inductance within the winding band, can be used as the return conductor or line. In the event the width of the windings of the measuring inductance is at least as large as the width of the winding band, then a partial area of the winding band can be shielded in such a manner by an electromagnetic shielding, so that an electromagnetic field coupling with the return conductor or line will be partially or completely avoided. For example, an A/D converter and a peak value rectifier for the effective value measurement can be provided for the detection of the measured values and for the evaluation of the output signals.

The measuring inductances or their connections (supply lines) are arranged in such a manner with respect to the winding band, so that a cancellation or weakening of the magnetic field generated by the winding band, and therewith a reduction or cancellation of the measured signal, will be avoided.

In the presented method, advantageously, a contact-less position detection (determination of the angular position) of the rotative part carrying out rotational movements can be achieved, without hereby causing mechanical frictions, rotational moments, or noises to arise, or mechanical parts to be moved. The position detection can be carried out over plural rotations of the movable part with a high signal amplitude, whereby the detection range is only limited by the rotating range of the winding band, and whereby a high interference security, especially relative to position variations of the winding band in the housing as well as relative to external electromagnetic couplings, is achieved.

BRIEF DESCRIPTION OF THE DRAWINGS

The method is to be described in the following in connection with an example embodiment with reference to the drawing.

DETAILED DESCRIPTION OF A PREFERRED EXAMPLE EMBODIMENT OF THE INVENTION

Figure 1:
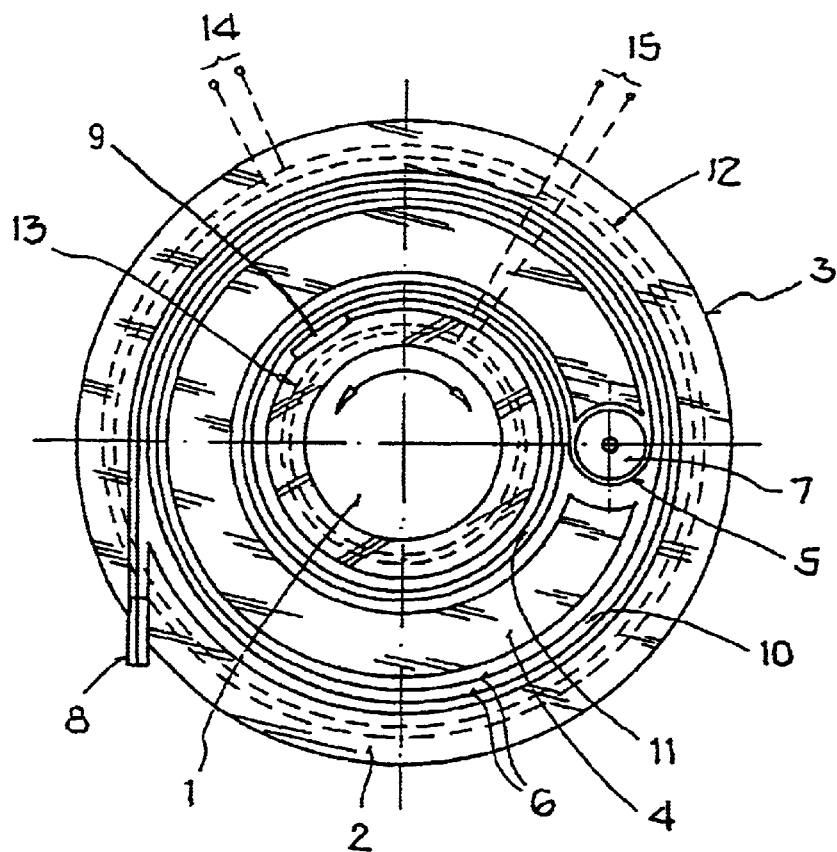
Figure 2:
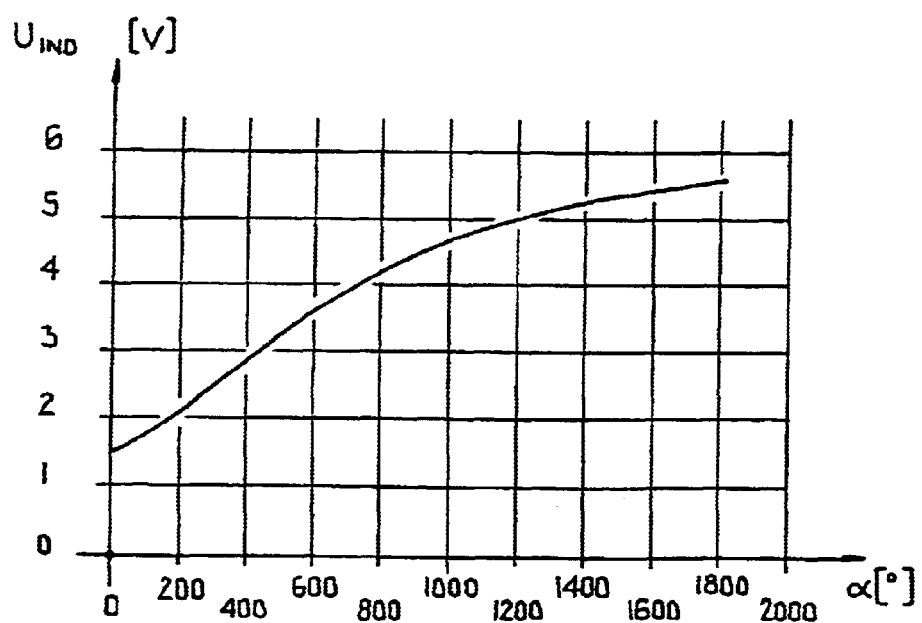

In this context, a schematic illustration of the arrangement of the winding band is shown in a plan view in FIG. 1, and a measuring diagram with the magnetic coupling as a function of the rotational angle is illustrated in FIG. 2.

According to FIG. 1, there is provided a winding band 5 that is arranged in a housing 3 and applied on a carrier 4, for the determination of the angular position of the rotative part 1 carrying out rotational movements with respect to a fixed stationary part 2. The winding band 5 consists of parallel guided electrical conductors 6. The necessary length of the winding band 5 prescribed by the rotational movement is limited by the deflection roller 7 and split into an outer part 10 and an inner part 11. The two electrical contacts or connections 8, 9 of the winding band 5 are provided for the signal transmission and for the electrical connection to the fixed stationary part 2. Signal lines (for example a plug contact) can be connected to the electrical contacts 8, 9. With a rotational movement of the rotative part 1, the winding-up of the winding band 5 varies, and there-with the length ratio of "outer layers" of the outer part 10 of the winding band 5 relative to the "inner layers" of the inner part 11 of the winding band 5. For the detection of the varying magnetic characteristics that result therefrom, for example two measuring inductances 12, 13 realized as coil windings are provided, and are, for example, arranged in the housing 3 of the winding band 5 immediately adjoining or bounding in a parallel plane to the winding band, and respectively comprise contacts 14, 15 for the tapping of signals. The first measuring inductance 12 with the contacts 14 in this context is coupled to the "outer layers" of the outer part 10 of the winding band 5, while the second measuring inductance 13 with the contacts 15 is coupled to the "inner layers" of the inner part 11 of the winding band 5. Through the two measuring inductances 12, 13, the variation of the magnetic coupling to the winding band 5 resulting due to the rotational movement of the rotative part 1 and therewith of the winding band 5, is detected, for example in that, an alternating voltage signal is fed as an input signal into one of the contacts 8, 9 of the winding band 5, and the resulting amplitude of the output voltage (of the induced voltage) arising on the contacts 14, 15 of the two measuring inductances 12, 13 is measured.

In an application example, the angular position of the steering column of a motor vehicle as a rotative part 1, relative to the stationary part 2 connected to the sleeve pipe, is to be detected, whereby the steering wheel angle prescribed by the rotatable steering column 1 can lie in a range of six steering wheel rotations ($\cong 2160°$). According to FIG. 2, the output voltage (induced voltage $U_{IND}$) that results due to the rotational movement and that is detected in the measuring inductances 12, 13, is illustrated as a function of the rotational angle αa. In this context, a rotational angle α from 0° to approx. 1800° can be detected based on the change of the induced voltage $U_{IND}$. Naturally, methods with technologies other than the winding band technology described here are also conceivable.

As used herein, the term "inductance" is to be understood to have the same meaning as the word "inductor", so that the terms "measuring inductance" and "measuring inductor" can be used interchangeably.

What is claimed is:

1. A method for determining an angular position of a rotative part (1) carrying out a rotational movement, wherein a wound-up length of a wound-up portion of a winding band (5) changes corresponding to the rotational movement of the rotative part, and wherein the winding band is arranged in a housing (3), is arranged on a carrier (4), and consists of at least one conductor (6), characterized in that at least one measuring inductor (12, 13) is provided, with which an electromagnetic field coupling to the winding band (5) is detected, and the rotational angle of the rotative part (1) is determined by evaluating the detected electromagnetic field coupling.

2. The method according to claim 1, characterized in that the at least one measuring inductor (12, 13) comprises a coil with a prescribed number of windings.

3. The method according to claim 1, characterized in that the at least one measuring inductor (12, 13) comprises a conductor path structure arranged on a carrier body.

4. The method according to claim 1, characterized in that the at least one measuring inductor (12, 13) is arranged in a parallel plane with respect to the winding band (5).

5. The method according to claim 1, characterized in that an alternating voltage is fed-in as an input signal, and that a voltage ($U_{IND}$) induced due to the electromagnetic field coupling is evaluated with respect to at least one of an amplitude, a frequency and a phase thereof, and the rotational angle of the rotative part (1) is determined from the at least one evaluated amplitude, frequency and phase.

6. The method according to claim 1, characterized in that at least two of the measuring inductors (12, 13) are provided, and that at least one of the two measuring inductors (12, 13) is utilized for reference measurements.

7. A method for determining an angular position of a rotative part, using an arrangement including a winding band that comprises at least one conductor and that has a first end coupled to said rotative part, a second end coupled to a non-rotative part, and a first wound-up portion as a portion of said winding band between said first and second ends, and further including a first measuring inductor arranged proximate to said first wound-up portion of said winding band, said method comprising the steps:

a) moving said rotative part through an angular rotation to an angular position, whereby a wound-up length of said first wound-up portion of said winding band varies in response to and dependent on said angular rotation;

b) detecting an electromagnetic field coupling between said first measuring inductor and said first wound-up portion of said winding band, wherein said electromagnetic field coupling varies in response to and dependent on said wound-up length of said first wound-up portion of said winding band; and c) evaluating said electromagnetic field coupling to determine therefrom said angular position of said rotative part.

8. The method according to claim 7, wherein said detecting of said electromagnetic field coupling in said step b) comprises applying an alternating voltage to at least said first wound-up portion of said winding band and measuring an induced voltage that arises in said first measuring inductor due to said electromagnetic field coupling.

9. The method according to claim 8, wherein said evaluating in said step c) comprises evaluating at least one parameter selected from the group consisting of an amplitude, a frequency and a phase of said induced voltage, with reference to a known relationship between said at least one parameter and said angular position over a range of values.

10. The method according to claim 7, wherein said first wound-up portion terminates at said first end and is wound-up around said rotative part.

11. The method according to claim 7, wherein said winding band further has a second wound-up portion, said arrangement further includes a second measuring inductor arranged proximate to said second wound-up portion, and said method further comprises detecting a second electromagnetic field coupling between said second wound-up portion of said winding band and said second measuring inductor.

* * * * *

UNITED STATES PATENT AND TRADEMARK OFFICE
CERTIFICATE OF CORRECTION

PATENT NO. : 6,670,804 B1
DATED : December 30, 2003
INVENTOR(S) : Glemser et al.

It is certified that error appears in the above-identified patent and that said Letters Patent is hereby corrected as shown below:

Column 1,
Line 14, before "many", replace "IN" by -- In --.

Column 2,
Line 6, before "object,", replace "he" by -- on the --.

Column 3,
Lines 25 to 28, delete "DETAILED DESCRIPTION OF A PREFERRED EXAMPLE EMBODIMENT OF THE INVENTION";
Between lines 33 and 34, insert:
-- DETAILED DESCRIPTION OF A PREFERRED EXAMPLE
EMBODIMENT OF THE INVENTION --;
Line 47, after "and", replace "there-with" by -- therewith --.

Column 4,
Line 13, before "In", replace "αa." by -- α. --.

Signed and Sealed this

Twenty-third Day of March, 2004

JON W. DUDAS
*Acting Director of the United States Patent and Trademark Office*